United States Patent [19]

Moriyama

[11] 4,412,747

[45] Nov. 1, 1983

[54] SEALING DEVICE IN MIXING EQUIPMENT

[76] Inventor: Masao Moriyama, No. 508-13, Tendocho 17, Nishinomiyashi, Hyogo, Japan

[21] Appl. No.: 346,594

[22] Filed: Feb. 8, 1982

[30] Foreign Application Priority Data

Feb. 6, 1981 [JP] Japan ................................. 56-17291

[51] Int. Cl.³ .............................................. B29B 1/06
[52] U.S. Cl. ................................. 366/99; 277/81 R; 366/64
[58] Field of Search ....................... 366/99, 98, 96, 64, 366/69, 79, 78, 185, 189, 297, 348, 349, 241; 277/81 R

[56] References Cited

U.S. PATENT DOCUMENTS

| | | | |
|---|---|---|---|
| 969,311 | 9/1910 | Houten | 366/99 |
| 2,576,575 | 11/1951 | Collins | 366/99 |
| 4,097,926 | 6/1978 | Face | 366/64 |

*Primary Examiner*—Robert W. Jenkins
*Attorney, Agent, or Firm*—Koda and Androlia

[57] ABSTRACT

A sealing device adapted for use in mixing equipment includes a cylindrical packing mantling an end portion of the rotating shaft of the mixing blade with a clearance interposed therebetween, the mixing blade including a shoulder from which the rotating shaft thrusts into a side wall of the bowl, the shoulder having a ring-shaped gasket filled in its surface, the cylindrical packing being extended sufficiently to emerge from the side wall of the bowl, and means for pressing the cylindrical packing against the side wall of the bowl so as to enable the cylindrical packing to come into constant abutment with the ring-shaped gasket, thereby allowing no gap to occur therebetween.

7 Claims, 7 Drawing Figures

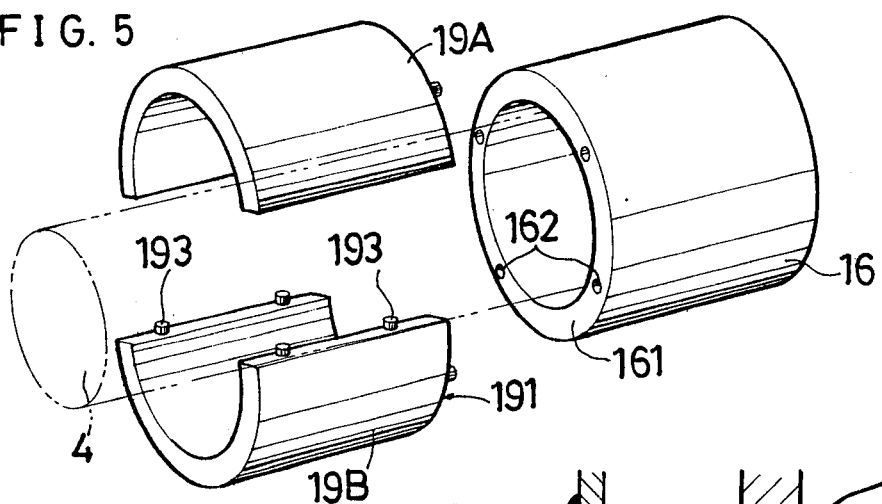
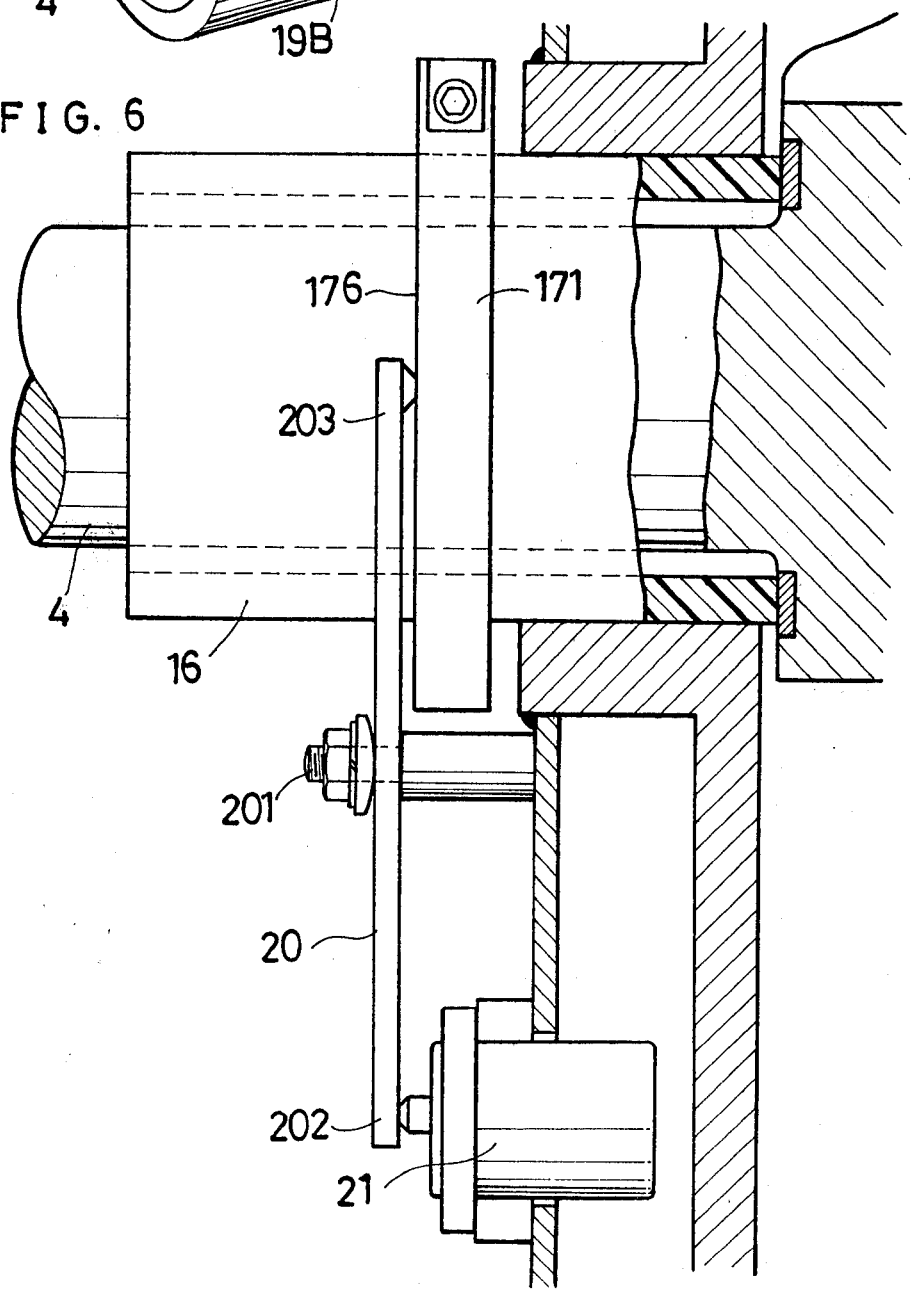

SEALING DEVICE IN MIXING EQUIPMENT

The present invention relates to a sealing device for use in mixing or kneading equipment including a rotary mixing blade and a bowl in which viscous liquids, such as rubber and plastic, are mixed. More particularly, the present invention relates to a sealing device for use in mixing or kneading equipment whereby the mixing liquid is prevented from leaking from where the rotating shaft of the mixing blade emerges from the bowl.

It has always been a problem with the mixing equipment to have a leakage occurring where the rotating shaft of the mixer emerges from the bowl in which a liquid is kneaded. To overcome this problem many proposals have been made, among which is a gland packing fitted around the rotating shaft, the gland packing being provided with braided ropes as asbestos, which are kept in contact with the rotating shaft. However, the difficulty with this type of sealing device is that the textile packing readily becomes saturated and deteriorated with the mixing liquid. Especially, when liquids of different colors are mixed one after another, a pigment of one color remaining in the texture of the packing admixes with a pigment of another color. This unintentional admixture of pigments appears as detrimental stains in the end product. To avoid this problem the gland packing must be replaced with a new one each time when different colors are treated. However, the replacement requires experience and skill, and additionally, special tools. This is labor-and time-consuming. Of course it reflects in the production costs.

OBJECTS AND SUMMARY OF THE INVENTION

The present invention aims at solving the problems pointed out above with respect to the conventional sealing device, and has for its object to provide an improved sealing device adapted for incorporation in mixing equipment in which the packing is constantly kept dry and free from a possible saturation of the mixing liquid.

Another object of the present invention is to provide an improved sealing device adapted for incorporation in mixing equipment in which the packing is resistant to abbrasion or wear, thereby ensuring a long period of use.

A further object of the present invention is to provide an improved sealing device adapted for incorporation in mixing equipment in which the packing, if required, can be readily replaced with a new one without the necessity of disassembling the mixing equipment.

A still further object of the present invention is to provide an improved sealing device adapted for incorporation in mixing equipment in which the packing has such toughness as to outwear the mixing equipment by reducing its physical wear to an allowable extent.

Other objects and advantages of the present invention will become more apparent from the following description when taken in connection with the accompanying drawings which show, for the purpose of illustration only, embodiments in accordance with the present invention.

According to the present invention a sealing device includes a cylindrical packing mantling an end portion of the rotating shaft of the mixing blade with a clearance interposed therebetween, the mixing blade including a shoulder from which the rotating shaft thrusts into a side wall of the bowl, the shoulder having a ring-shaped gasket filled in its surface, the cylindrical packing being extended sufficiently to emerge from the side wall of the bowl, and means for pressing the cylindrical packing against the side wall of the bowl so as to enable the cylindrical packing to come into abutment with the ring-shaped gasket, thereby allowing no gap to occur therebetween.

BRIEF EXPLANATION OF THE DRAWING

FIG. 5 is an analytical perspective view showing the embodiment of FIG. 4;

FIG. 6 is a cross-sectional view showing a further modified version of the embodiment.

DETAILED DESCRIPTION OF THE PREFERRED EMBODIMENTS

Figure 1:
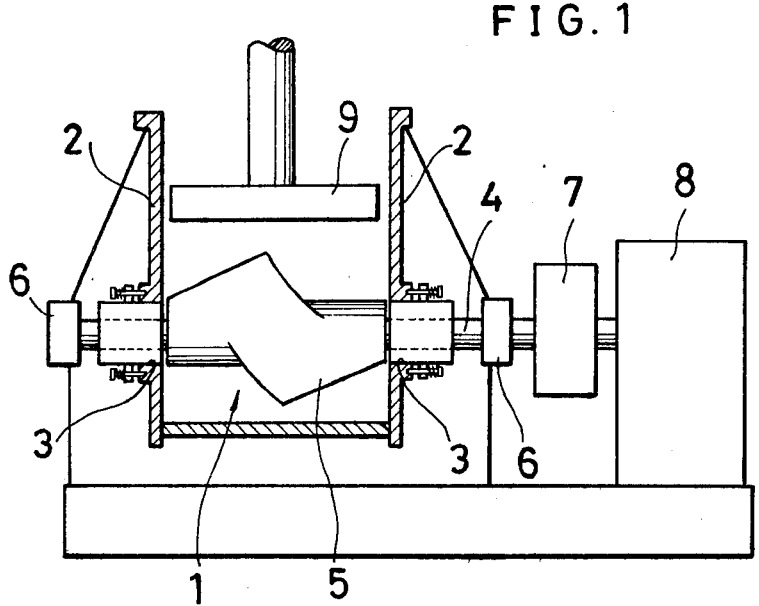
FIG. 1 is a schematic view showing the mixing equipment in common use.

The mixing equipment, commonly called a kneader, is constructed as follows:

A mixing blade 5 has a rotating shaft 4, which is passed through bores 3 produced in opposite side walls 2 of a bowl 1, the rotating shaft 4 being carried on a pair of bearings 6 located outside the bowl 1. The rotating shaft 4 is rotated by power through gears 7, a clutch and a speed change gear 8. A liquid is mixed or kneaded by the mixing blade 5 in the bowl 1. In this case the mixing liquid tends to leak at a point where the rotating shaft 4 emerges from the bowl 1. The reference numeral 9 designates a lid, which is optionally used to cover the bowl 1 when the liquid is mixed under pressure.

The present invention provides a sealing device adapted for use in the mixing equipment constructed in this way. In the following description the explanation will be given only with respect to the left-hand section of the rotating shaft, the right-hand section being omitted for simplicity. It should be noted that the right-hand section has the same function and construction.

The mixing blade 5 has a shoulder 14 at its end portion, which shoulder 14 is located close to the inner surface of the side wall 2 of the bowl 1. In addition, the shoulder 14 is so designed as to align with a plane perpendicular to the rotating shaft 4. A ring-shaped gasket 18 is filled in the shoulder 14, the gasket 18 being adapted to receive a cylindrical packing 16, which is constantly pressed against the gasket 18 so as to avoid the occurrence of a gap therebetween. This arrangement will be hereinafter described in greater detail. The gasket 18 is made of wear-resisting material, such as super-hard alloy or ceramics.

Figure 2:
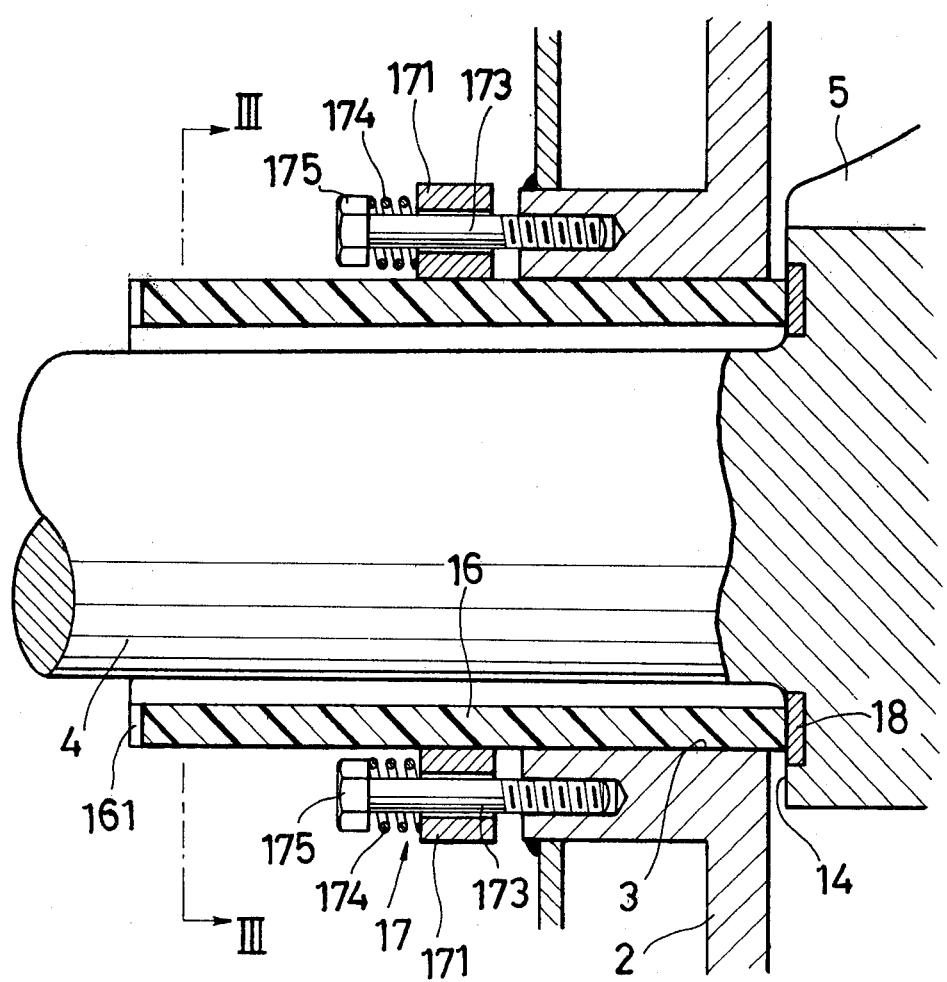
FIG. 2 is a cross-sectional view showing a sealing device constructed in accordance with the present invention.

As best shown in FIG. 2, the rotating shaft 4 emerges from the bowl 1 through the bore 3. The emerging portion of the rotating shaft 4 is mantled by the cylindrical packing 16 with a clearance interposed therebetween. The cylindrical packing 16 is pressed against the ring-shaped gasket 18 so as to allow no gap therebetween. If any gap arises, the cylindrical packing will fail to prevent the mixing liquid from leaking from the bowl 1 in the course of mixing.

The cylindrical packing 16 is made of an impermeable material like plastics, which will not deform in encounter with heat and pressure. The packing 16 is molded into a cylindrical form. As it is not uncommon that the packing is subjected to an elevated temperature provided by the kneading liquid it is required to withstand heat. In addition, the packing 16 must have a small coefficient of friction, and wear-resisting property. As one of the desirable materials an engineering plastic is recommended which is made of a cotton cloth impregnated with a mixture of phenol resin and fluorine contained resin. Other recommendable materials are plastics made from one of the following substances or a mixture thereof: phenol resin, urea resin, polyester regin, melamine regin, and silicone regin. Also, ebonite or carbon is usable.

As described above, the cylindrical packing 16 is constantly pressed against the ring-shaped gasket 18, wherein the pressing is effected by a packing holder unit 17. The packing holder unit 17 includes a clamping ring 171 and bolts 173. The clamping ring 171 is fitted around the cylindrical packing 16 in a tight manner. The bolts 173 are passed through a peripheral portion of the ring 171 and driven into the side wall 2 of the bowl 1. The ring 171 is tightened or untightened by means of a fastening bolt 172 (FIG. 3); when it is tightened, the cylindrical packing 16 is tightly clamped.

In the illustrated embodiment four bolts 173 are used. Each bolt 173 has a head 175 and a compression spring 174. The position of the cylindrical packing 16 can be adjusted with respect to the gasket 18. If the cylindrical packing 16 becomes diminished and any gap is likely to occur therebetween, the clamping ring 171 is untightened, and the cylindrical packing 16 is slightly advanced until it is placed into abutment with the gasket 18.

To make up for the shortened length of the cylindrical packing 16, it is possible to previously place a fresh cylindrical packing concentrically with the cylindrical packing 16. To prevent the fresh packing from rotating, the cylindrical packing 16 can be provided with a recess at 161 while the fresh packing is provided with a mating projection. In this way the integral union of the using packing and a fresh packing is secured. Alternatively, the fresh cylindrical packing can be bonded to the terminating end 161 of the cylindrical packing 16 with a suitable adhesive.

Figure 4:
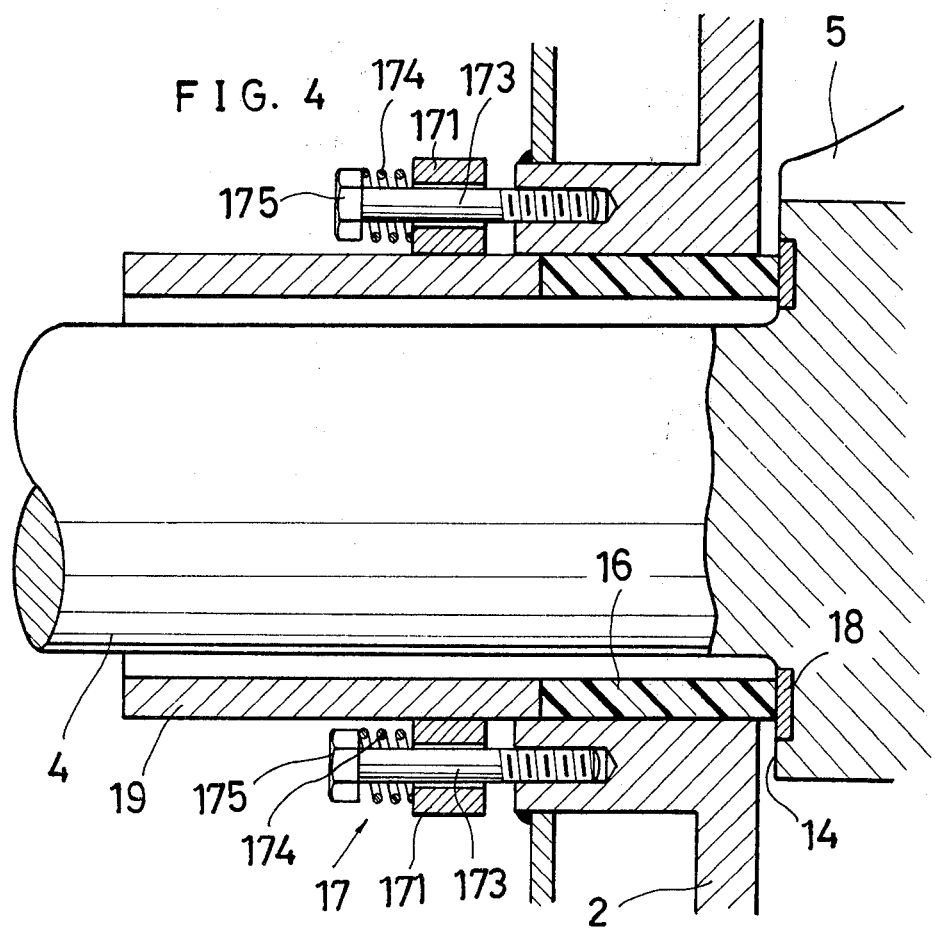
FIG. 4 is a cross-sectional view showing a modified version of the embodiment.

FIGS. 4 and 5 show an alternative version of the embodiment in which instead of the fresh cylindrical packing a metallic pusher 19 is employed. The pusher 19 consists of axially halved parts 19A and 19B, which can be readily united by means of dowelling; the reference numeral 193 designates dowels produced on the cut face of the part 19B. The pusher 19 is connected to the cylindrical packing 16 by means of dowelling; the reference numeral 162 designates holes adapted to receive the dowels (not shown) on the end face 191 of the pusher 19. This embodiment has an advantage that the pusher 19 can be mounted or dismounted without removing the rotating shaft 4 from the bearings 6.

Figure 3:
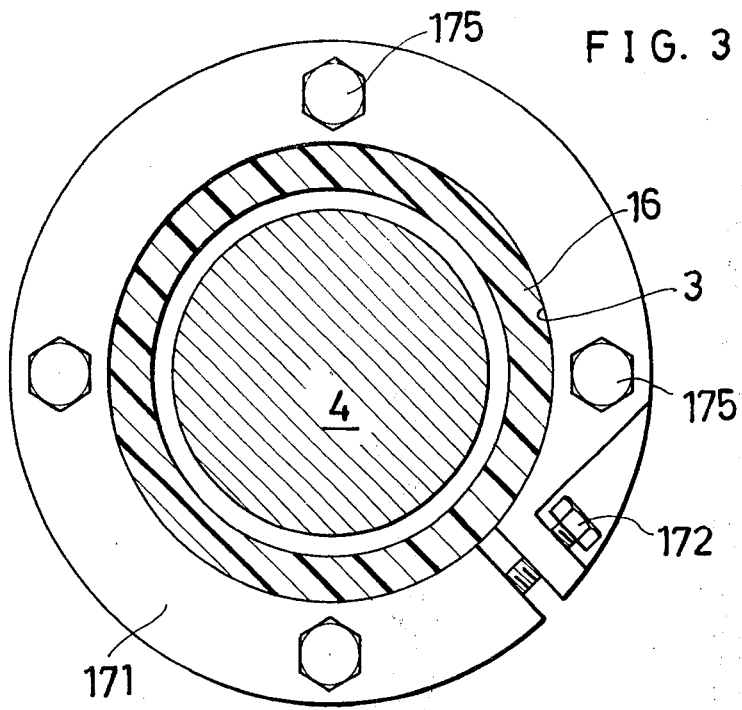
FIG. 3 is a vertical cross-section taken along the line III—III in FIG. 2.
Figure 7:
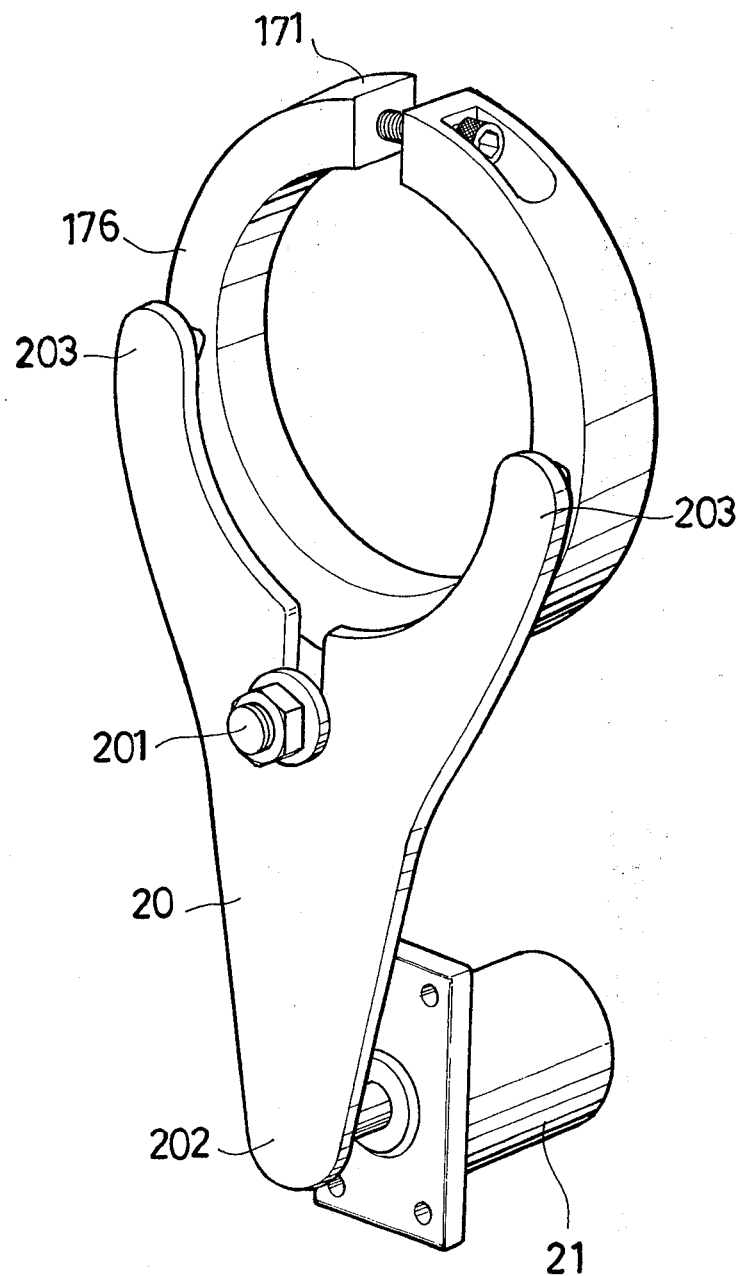
FIG. 7 is a perspective view showing the main part of the embodiment of FIG. 6.

FIG. 6 shows a further modified version in which a pneumatic pressure is used to press the ring 171 (acccordingly, the cylindrical packing 16) toward the side wall 2 of the bowl 1. The cylindrical packing 16 is tightened by the ring 171 in the same manner as shown in FIG. 3. The ring 171 is pressed toward the side wall of the bowl by means of a forked lever 20, which is swung by means of a pneumatic cylinder 21. The forked lever 21 is constructed so as to swing at its fulcrum 201 where the forked lever 21 is pivotally connected to the side wall 2 of the bowl 1, wherein its point of applied force is located at 202 and its points of action at 203 as best shown in FIG. 7. At the point 202 the forked lever 20 is connected to a piston of the pneumatic cylinder 21. The forked lever 20 is provided with a projection on each fork end (not numbered), which is adapted to be abutted to an end face 176 of the ring 171 so as to apply a pushing force thereto. The pneumatic pressure in the cylinder 21 is kept constant so that a constant strength of pushing force is applied to the ring 171 (accordingly, the cylindrical packing 16). In this way no gap is allowable between the terminating end of the cylindrical packing 16 and the gasket 18.

As an experimental example, the cylindrical packing 16 was molded with a cotton cloth impregnated with a mixture of phenol resin and fluorine contained resin. By virtue of the phenol resin and cotton contained therein no substantial deformation nor deterioration in strength was found in encounter with an elevated temperature. In addition, by virtue of the fluorine content the coefficient of friction was found small. In this way, it has been demonstrated that this cylindrical packing has desirable wear- and heat-resisting properties. After a year's use the cylindrical packing has only diminished by 6 mm, and the gasket only by 0.2 mm. The cylindrical packing has demonstrated its superior wear-resisting property. During the year's use no leakage was caused. In addition, the clearance between the rotating shaft of the mixing blade and the cylindrical packing was found dry all the time.

What is claimed is:

1. In mixing equipment for mixing viscous liquids, including a bowl having side walls, a mixing blade carried on a rotating shaft extending through a bore in said side walls of said bowl and supported on bearings located outside bowl, and a sealing device preventing the mixing liquid from leaking from where the rotating shaft emerges from the bowl, said sealing device comprising:
   a cylindrical packing surrounding said emerging portion of said rotating shaft and extending through said bore in said bowl, said cylindrical packing being supported on said side walls of said bowl with a clearance interposed therebetween and such that an inside surface of said packing is exposed to air, said packing further being made of plastic;
   said mixing blade including a shoulder at each end portion from which said rotating shaft thrusts into the side wall of said bowl to emerge therefrom;
   said shoulder having an engaging face for engagement with the end face of said cylindrical packing;
   said cylindrical packing being extended sufficiently to cover said emerging portion of said rotating shaft;
   means for pressing said cylindrical packing against said engaging face; and
   said pressing means being adjustably fixed to said side wall of said bowl.

2. A sealing device as set forth in claim 1, wherein said pressing means comprises a ring-shaped clamp and a fastening means for holding said ring-shaped clamp such that said ring-shaped clamp is pressed toward said side wall of said bowl, said fastening means being adjustably fixed to said side wall of said bowl.

3. A sealing device as set forth in claim 1, wherein said pressing means comprises a ring-shaped clamp and a pneumatic cylinder adapted to transmit pneumatic pressure to said ring-shaped clamp, thereby enabling said cylindrical packing to be pressed against said ring-shaped gasket.

4. A sealing device as set forth in claim 1, wherein said pressing means comprises a spring interlocated between said ring-shaped clamp and said fastening means.

5. A sealing device as set forth in claim 1, further comprising an auxiliary cylinder having the same cross-sectional area as that of said cylindrical packing, said auxiliary cylinder being integrally connected to said cylindrical packing, said auxiliary cylinder being adapted to be pressed toward said side wall of said body by said pressing means in place of said cylindrical packing.

6. A sealing device as set forth in claim 5, wherein said auxiliary cylinder comprises axially halved parts, said parts being separably united.

7. A sealing device as set forth in claim 1, wherein said shoulder includes a gasket of wear-resisting material provided in said engaging face.

* * * * *